United States Patent

Eul, Jr. et al.

[15] 3,647,990

[45] Mar. 7, 1972

[54] DEMAGNETIZER/CLEANER

[72] Inventors: Edward A. Eul, Jr., Northbrook; Ronald B. Richter, Rolling Meadows, both of Ill.

[73] Assignee: Ampex Corporation, Redwood City, Calif.

[22] Filed: Jan. 30, 1970

[21] Appl. No.: 6,984

[52] U.S. Cl. ....................179/100.2 Z, 179/100.2 D, 274/47, 317/157.51

[51] Int. Cl. ....................G11b 5/46

[58] Field of Search ..............179/100.2 D, 100.2 Z, 100.2 K, 179/100.2; 274/47; 317/157.51

[56] References Cited

UNITED STATES PATENTS

| | | | |
|---|---|---|---|
| 3,443,037 | 5/1969 | Dann | 179/100.2 D |
| 3,069,815 | 12/1962 | Valentine | 224/47 |
| 3,156,784 | 11/1964 | Kump | 179/100.2 D |
| 3,435,300 | 3/1969 | Sato | 317/157.51 |
| 3,439,922 | 4/1969 | Howard | 179/100.2 Z |
| 3,449,528 | 6/1969 | Camras | 179/100.2 D |

*Primary Examiner*—Bernard Konick
*Assistant Examiner*—Robert S. Tupper
*Attorney*—Fitch, Even, Tabin & Luedeka and Robert G. Clay

[57] ABSTRACT

Transducer heads of a magnetic tape recording or playback apparatus may be demagnetized by placing a multipolar, permanent magnet adjacent to the transducer head, rotating the magnet to create a reversing flux field and moving the magnet away from the transducer head to diminish gradually the intensity of the field. A simultaneous demagnetizing and cleaning of the transducer head in a cartridge-receiving or cassette-receiving playback or recording apparatus is achieved by having both the magnet and a cleaning tape mounted in a cartridge or cassette and by using the tape drive to cause the magnet to rotate and to move away from the transducer head.

13 Claims, 4 Drawing Figures

Patented March 7, 1972 3,647,990

2 Sheets-Sheet 1

INVENTORS
EDWARD A. EUL JR.
RONALD B. RICHTER

Anderson, Luedeka, Fitch, Even & Tabin
ATTYS.

INVENTORS
EDWARD A. EUL JR.
RONALD B. RICHTER

Anderson, Luedeka, Fitch, Even & Tabin
ATTYS.

DEMAGNETIZER/CLEANER

This invention relates to a method of and an apparatus for demagnetizing a transducer head of a magnetic tape recorder or player; and this invention also relates to a combined transducer head cleaner and demagnetizer for use with a magnetic tape recorder or player.

The playback or recording heads of a magnetic tape recorder or player have been demagnetized heretofore with an electrical unit which plugged into a suitable 110-volt AC current source and had pole pieces which were passed closely adjacent and across the surface of these heads and then slowly withdrawn to allow the influence of the AC field to die away gradually. Such demagnetizing units are quite satisfactory for use by professionals who understand their use and who also have a knowledge of the playback and recording apparatus. Another drawback to use of such demagnetizing units is that many magnetic tape playing or recording apparatus are of the cassette or tape cartridge kind which have transducer heads which are not exposed or readily accessible to the view of the person desiring to demagnetize the same. For example, the magnetic transducer heads in an automobile, magnetic tape playback apparatus, such as shown in U.S. Pat. No. 3,478,973, are beneath the dashboard of an automobile and accessible only through the cartridge-receiving slot. Also, for automobiles or other types of mobile equipment, a 110-volt AC power source is not always conveniently available. Thus, there is a need for a more simple method of and apparatus for demagnetizing transducer heads particularly for use with cartridge or cassette playback or recording apparatus.

Another maintenance problem with playback or tape recording apparatus is to remove dust and tape debris, such as dirt and iron oxide, from the transducer head and parts of the tape transport mechanism such as a tape drive capstan and a cooperating pressure roller. The accumulation of debris on the transducer may give rise to noise or distortion and likewise an accumulation of debris on the tape transport parts may interfere with proper tape transport which requires a substantially constant linear velocity for good sound fidelity.

Accordingly, a general object of this invention is to provide a method and an apparatus for demagnetizing transducer heads which overcomes the shortcomings of prior art demagnetizing units.

Another object of the invention is to provide a cassette or cartridge like demagnetizer and cleaner unit for use with tape recorders or players which use magnetic tape cartridges or tape cassettes.

Another objects and advantages of the invention will become apparent from the following detailed description taken in connection with the accompanying drawings in which.

Figure 1:
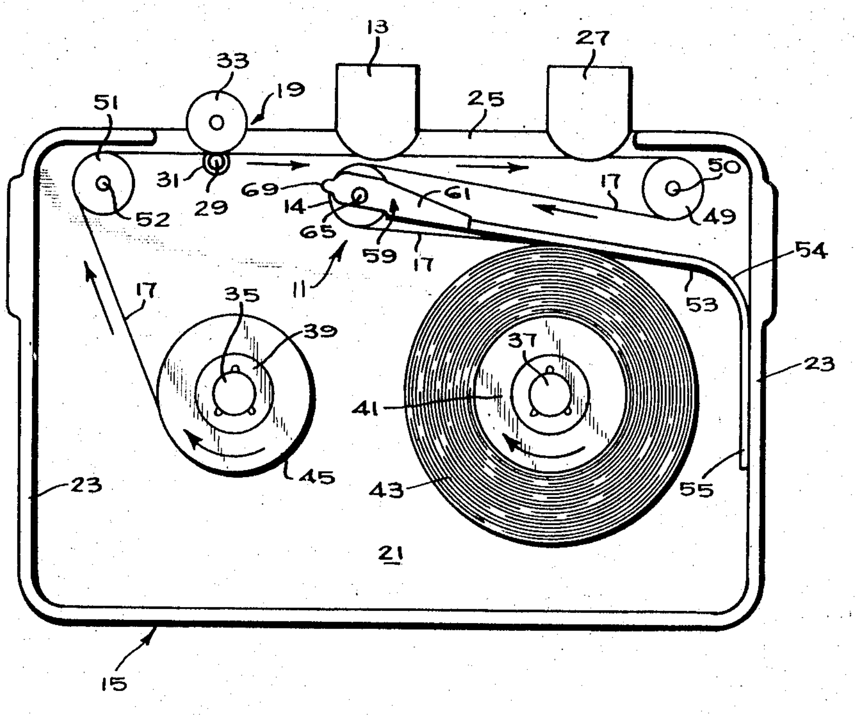
FIG. 1 is a bottom view of a cassettelike unit with a bottom cover removed showing means for demagnetizing and cleaning transducer heads and constructed in accordance with a preferred embodiment of the invention.

As shown in the drawings for purposes of illustration, the invention is embodied in an apparatus 11 for demagnetizing a transducer head 13 of a magnetic tape player or recording apparatus (not shown) without having to provide an electrical power source connection thereto as with prior art demagnetizers. The demagnetizing apparatus 11 demagnetizes the transducer head by the method steps of: placing a multipolar, permanent magnet 14 adjacent the transducer head, rotating the magnet to create a reversing flux field, and moving the magnet away from the transducer to diminish gradually the intensity of the field and thereby demagnetize the transducer head. The demagnetizer apparatus 11 is particularly useful for magnetic tape playback or recording apparatus which use standard cassettes or cartridges having magnetic tapes therein because the demagnetizer apparatus 11 may be readily housed in a housing similar in size and shape to either a tape cassette or cartridge for insertion into operative relationship with the transducer head 13 of the magnetic tape player or recorder apparatus in the manner that the usual cassette or cartridges are used for either a playback or recording operation. As will be explained, the demagnetizer apparatus 11 operates simply with insertion and normal operation of the playback/recording apparatus and hence doesn't require a special knowledge or skill.

Also, in accordance with the preferred embodiment of the invention, a cassette or cartridge-like unit is provided with a demagnetizer means and also a cleaning tape means including a cleaning tape 17 which is driven past the playback or recording head 13 and also past a tape-transporting means or mechanism 19 to wipe away dirt or other foreign matter which might have accumulated thereon. Thus, a simultaneous cleaning and demagnetizing operation may be accomplished merely by inserting the cassette or cartridge unit into the playback or recording apparatus without any knowledge of the operation thereof. With the playback or recording apparatus in the "-play" mode, as will be explained in greater detail herein, the tape-driving mechanism 19 drives the cleaning tape 17 and through suitable means rotates the magnet 14 and shifts the magnet away from the transducer head at a slow rate to provide a gradually diminishing magnetic field to the transducer.

Figure 2:
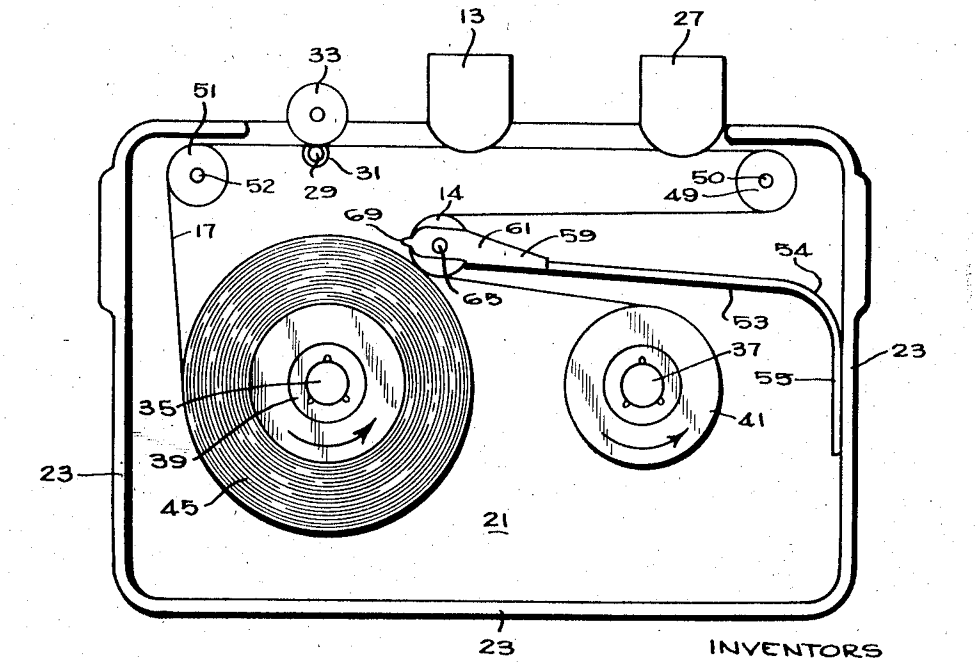
FIG. 2 illustrates the unit of FIG. 1 at completion of a cleaning and demagnetizing operation.

Referring now in greater detail to the first embodiment of the invention illustrated in FIGS. 1 and 2, the external cassette casing or housing 15 is substantially similar to the housing of a magnetic tape cassette so that the housing 15 may be inserted in lieu of the tape cassette into position with the player or recording apparatus so that the cleaning tape 17 therein is aligned and moved by the tape-transporting mechanism 19 of the apparatus in the customary manner for transporting a magnetic tape. More specifically, the cassette housing 15 is formed in two joined halves from a molded plastic material with a top cover wall (not shown) and depending sidewalls 23 which are integral with the top wall and a bottom wall 21. Openings 25 are provided in the front sidewall 23 of the cassette housing 15 to receive the playback and/or record head 13 and also to receive an erase or other head 27 (if one is used). A tape-engaging capstan 29 of the playback or recording apparatus may be inserted through an opening 31 in the bottom wall 21 to a position behind the inner side of the tape 17 while a pinch roller 33 of the tape feed mechanism projects through the opening 25 in the housing front sidewall to engage the tape and establish a feed couple for the tape.

Also, in a conventional manner, spindles 35 and 37 of the playback or recording apparatus are inserted into openings in the respective reels 39 and 41 in the cassette housing 15 to wind the cleaning tape 17 in a coil 43 (FIG. 1) on the reel 41 or in a coil 45 on the reel 39 (FIG. 2). The cleaning tape 17 is fed past the transducer head 13 in the customary manner for transporting magnetic tape. At the start of the tape-cleaning operation, the cleaning tape 17 is coiled substantially on the right-hand reel 41 (as viewed in FIG. 1) and the tape uncoiled therefrom travels across the magnet 14 and about a guide roller 49 journaled on a spindle 50 and past erase head 27 and transducer head 13 along a path substantially parallel to the front sidewall of the cassette housing to return guide roller 51 journaled on a spindle 52. The tape is being coiled on the reel 39 during the cleaning and demagnetizing operation.

In accordance with the important aspect of the invention, the magnet 14 is rotated in a controlled and uniform manner to provide to the transducer head a flux field of reversing polarity which is gradually diminished in a controlled manner. More specifically, the cleaning tape 17 is wrapped partially about the magnet and has sufficient frictional engagement and wrapping contact therewith to prevent substantial slippage between the tape and the magnet with the result that the peripheral surface of the magnet has a velocity substantially identical to the linear velocity of the tape. Thus, the magnet 14 has a peripheral surface speed substantially equal to the usual range of tape transport speeds for a magnetic tape in a cassette. The illustrated magnet is about 0.375 inch in diameter, about 1.125 inch in width, and made of barium oxide with pole centers diametrically opposite. It will be understood that other magnetic materials and sizes of magnets may be used in lieu of the illustrated magnet 14 to provide a flux field.

For the purpose of shifting the magnet 14 away from the transducer head 13 at a slow and controlled rate, the magnet 14 is biased to move away from the transducer head and is allowed to move under this bias with tape movement. More specifically, the magnet 14 is carried on a spring arm 53 which engages the outer peripheral surface of the tape coil 43 and the spring arm functions as a cam follower in that it is biased to follow the outer surface of diminishing diameter coil 43 of cleaning tape. Consequently, the spring arm 53 pivots the magnet from a position closely adjacent the play/record head 13 at a rate controlled by the unwinding of tape to a position farther therefrom as illustrated in FIG. 2. The spring arm 53 for carrying the rotatable magnet is preferably formed in an inexpensive manner from a piece of nonmagnetic spring metal and pivots about a bent portion 54 of a wide radius, e.g., 0.437 inch, leading to a leg 55 which extends along and abuts a sidewall 23 of the cassette housing. An inexpensive manner of securing the spring leg 55 in this position along the sidewall 23 is to provide four small pointed tangs 57 on opposite sides of the spring leg to bite into the upper and lower plastic cover walls of the cassette housing when the split halves thereof are secured together in the usual manner. Thus, the spring leg 55 is secured in position with the spring arm 53 projecting laterally therefrom to a free end thereof located generally centrally of the cassette and between the tape reels.

On the outer free end of the spring arm 53 is formed a magnet supporting yoke 59 which includes a pair of bent flanges 61 defining a channel or slot therebetween. The magnet 14 is journaled for rotation at and relative to the yoke flanges by an axle 65 made of nylon which axle has stub ends inserted into openings in the yoke flanges permitting a free and easy turning of the magnet and the pin axle 65. The pin axle 65 is inserted into a central aperture in the magnet 14, which is annular in shape; the axle has a fluted periphery to grip the inner aperture defining wall in the magnet. Thus, the magnet is journaled by the pin axle for rotation about an axis through the pin 65 and openings 63 in the yoke flanges 61. To assist in guiding the tape 17 and to prevent sliding of the tape 17 lateral off the magnet a pair of diverging tabs 69 on the outer ends of the yoke flanges extend radially outward of the peripheral surface of the magnet to capture the tape therebetween.

The preferred cleaning tape 17 is a commercially available tape of the nonabrasive kind although an abrasive tape carrying fine abrasive material bonded to the tape may be used. Both abrasive and nonabrasive cleaning tapes for cleaning sound transducer heads are commercially available. The preferred polyester paper is semitransparent and has a rough weave appearance generally similar to that of woven cloth. It will be appreciated that other types of cleaning tape may be used in lieu of this preferred tape and still fall within the scope of the invention. Also, the cleaning tape 17 may be quite long and wound and rewound between the tape reels 39 and 41 in the manner of magnetic tape cartridges.

Figure 3:
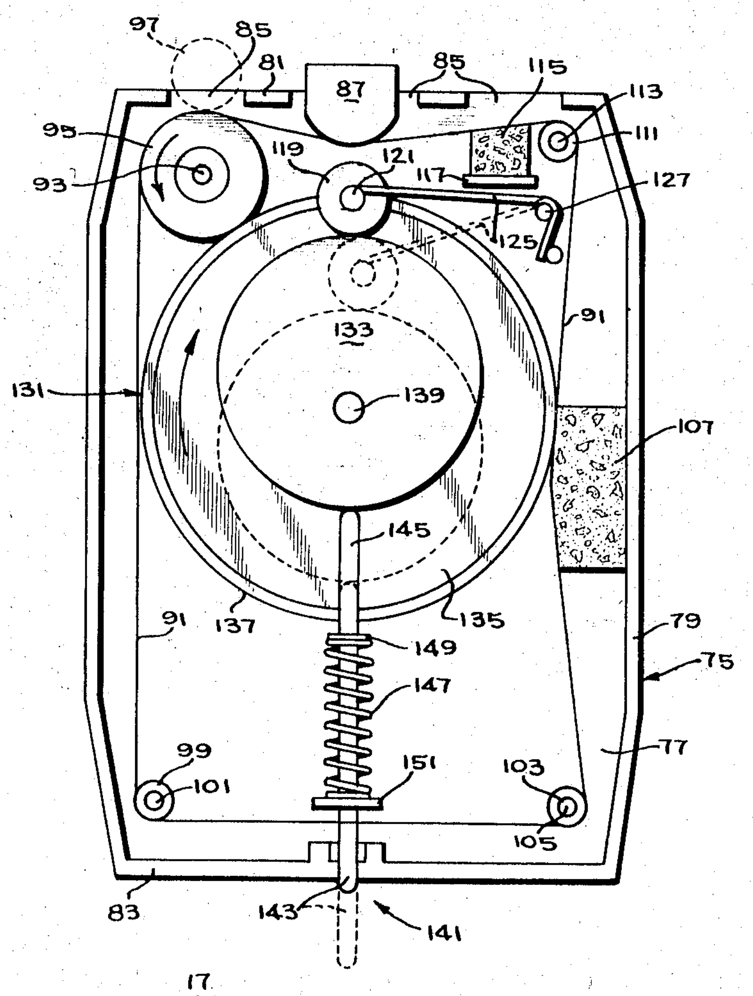
FIG. 3 is a bottom view of a cartridge like demagnetizer and cleaner unit with a bottom cover removed showing another embodiment of the invention.
Figure 4:
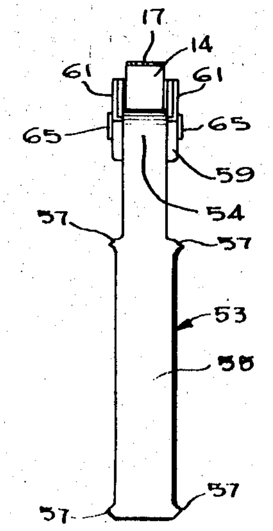
FIG. 4 is a view of a spring arm for supporting a magnet for the unit of FIG. 1.

Referring now to the embodiment of the invention illustrated in FIG. 3, the illustrated tape cartridge housing 75 is of a standard size and dimension for insertion into a magnetic tape cartridge receiving playback apparatus such as disclosed in the aforementioned patent or for use in other types of cartridge-receiving recorders or playback apparatus. Briefly, the cartridge is formed with a plastic housing which has a bottom wall 77, a top wall (not shown), sidewalls 79, a front sidewall and a rear sidewall 83. The front sidewall 81 has a series of openings 85 therein including a central opening 85 into which projects a sound transducer head 87 for engagement with a cleaning tape 91 which in this instance is in the form of a single endless band. Journaled on a spindle 93 in the cartridge is a conventional pressure roller 95 which will cooperate with a tape-driving capstan 97 which is inserted through opening 95 in the housing front wall to engage the tape 91 and establish a driving couple whereby the endless tape will be driven past the transducer head at a substantially constant linear velocity. The cleaning tape 91 extends from and is driven by the pressure roller 95, as viewed in FIG. 3, towards the rear housing wall 83 to a guide roller 99 journaled on a supporting spindle 101 formed on the housing. The tape 91 extends across and generally parallel to the rear wall of the cartridge to a similar guide roller 103 journaled on a spindle 105 and then extends forwardly across a foam pressure pad 107 which provides pressure on the tape to keep the same taunt. The endless tape 91 moves past this pressure pad which is fixed to the housing sidewall 79 to a forward roller 111 journaled on a spindle 113 to rotate about an axis which is slightly forward of and opposite the pressure roller 95. From guide roller 111, the tape moves past another foam pressure pad 115 backed by and fastened to a plate 117 fixed to the top wall of the housing. The pressure pads 107 and 115 act in cooperation to provide sufficient tension in the tape to assure a good wiping and cleaning contact with the curved surface of the sound transducer head 87. It will be appreciated that intimate rubbing contact with the transducer head 87 is desirable for cleaning. The pads 107 and 115 are preferred rather than using a conventional pressure pad which engages a magnetic tape in a conventional tape cartridge and holds the same in direct contact with the sound transducer head as the conventional pressure pad would be interposed between the magnet and the transducer head. As the tape moves across the head, it wipes the same clean and likewise the tape will wipe dirt and other matter from the tape-driving capstan 97 and the pressure roller 95.

To demagnetize the transducer head 87, a rotatable, permanent magnet 119 is mounted on an axle 121 journaled in a yoke fixed to free end of a spring arm 125. The spring arm 125 extends to a post 127 and then is bent rearwardly and captured between the first post 127 and a second post 129, both of the posts being integrally attached to a wall of the housing 75. The spring arm 125 is in a flexed condition when it is in the position adjacent the transducer head, as shown in solid lines in FIG. 3 and the spring arm will return the magnet 119 towards the dotted line position away from the transducer head in a gradual and continual manner as controlled by a cam means 131.

The preferred means for shifting the magnet 119 away from the transducer head at a controlled and gradual rate to decrease the intensity of the magnetic field and to rotate the magnet to generate the alternating current field is the cam means 131 which includes an eccentric cam 133 and a supporting disc or wheel 135 which is adapted to be driven by the pressure roller 95 at a controlled rate of speed. More specifically, the wheel 135 is provided with an outer, peripheral elastomeric tire 137 for engagement with the periphery of the pressure roller 95 at a position inward of the capstan 97 engaging position. The wheel 135 is journaled for rotation on a post 139 fastened to a housing wall. Fixed to one face of the wheel 135 is the eccentric cam 133 which is circular in shape but with its center offset from the axis of the wheel at the post 139.

At the start of the demagnetization operation, the eccentric cam 133 will be in a position to hold the magnet 119 closely adjacent the transducer head 87, as illustrated in solid lines in FIG. 3. As the eccentric cam 133 turns, the peripheral surface of the cam moves away from the transducer head 87 allowing the spring arm 125 to cause the magnet 119 to follow the same. When the eccentric cam 133 turns, its peripheral surface which is in frictional contact with the peripheral surface of the multipolar magnet 119 turns the magnet about the axis through the supporting axle 121 to provide the reversing flux field. At the same time the peripheral surface most closely adjacent the cam is gradually moving away from the transducer head 87 and the spring arm 125 causes the magnet 119 to follow to provide the decreasing intensity of field. When the eccentric cam 133 is moved through 180° from the position illustrated in solid lines, the magnet 119 is moved away from the transducer head 87 to the maximum possible extent, as illustrated in dotted lines in FIG. 3. In this position, the demagnetizing operation is finished and the cartridge may be removed.

To assist the operator in the use of the cartridge demagnetizer and cleaner, it is preferred that indicating means 141 be provided to indicate at least the time for termination of the demagnetizing and cleaning operation such as by removing the same from the playback or recording apparatus. The indicating means 141 includes a rod 143 having an inner end 145 in riding engagement with the periphery of the eccentric cam 133. The rod 143 is biased by a spring 147 encircling the rod inwardly into engagement with the cam 133 and as the cam rotates to a position closer to the rear cartridge wall 83 the rod is cammed rearwardly to compress the spring 147. The spring 147 is a coiled compression spring having one end abutting a washer 149 fixed to the rod 143 and another end abutting a plate 151 fastened to a wall of the cartridge. The plate 151 has an aperture therein for receiving guiding the rod 143 as does a similar aperture in the rear cartridge wall 83. When the eccentric cam 133 is moved from a "begin" to a "-stop" position, the latter being illustrated in dotted lines in FIG. 3, the rod 143 will be forced outwardly relative to the rear cartridge wall 83, as shown in dotted lines to indicate that the cartridge may be removed or the tape movement may be otherwise terminated by operation of suitable control button of the playback apparatus. If desired, the rod may carry a suitable flag or stop indicia thereon to indicate that when it is out of the cartridge that the operation should be terminated. Other indicating means such as a window located at the back of the cartridge and a colored section of the tape may also be used.

From the foregoing it will be seen that the present invention provides a simple manner of demagnetizing and cleaning a transducer head and or tape transporting means for a magnetic tape recorder or player. The apparatus for demagnetizing is quite simple and is operable without any special knowledge or skill being required of the operator. In the preferred embodiment, a combined demagnetizer and cleaner are housed within a cassette- or cartridge-like unit which is inserted into the playback or recording apparatus in the usual manner for inserting a cassette or cartridge. The driving of the cleaning tape by the tape transport mechanism provides the force for rotating the magnet and shifting the same relative to the transducer head. Various kinds of magnets may be used and good results are obtained with field strengths varying over a wide range. Also, the magnets may be rotated at various frequencies other than of the common 60-cycle frequency used with 110 AC demagnetizer units of the prior art and moved away from the transducer head at various speeds. The method of demagnetizing a transducer head is simple and inexpensive and eliminates the need for an AC power source as heretofore used with prior art demagnetizing methods and apparatus.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A self-contained demagnetizer unit for use with a transducer head of a magnetic tape recording or playback apparatus comprising: a housing for positioning in the apparatus adjacent the transducer head, a multipolar, permanent magnet, means for supporting said magnet in said housing for positioning said magnet adjacent said transducer head, means to turn said magnet to produce a reversing flux field, and means in said housing to shift said magnet relative to said housing and said transducer head to diminish the intensity of said field relative to said transducer head and thereby demagnetize said transducer head.

2. A self-contained unit for cleaning and demagnetizing a transducer head of a playback or recording apparatus, the combination of a housing for positioning in the apparatus adjacent the transducer head, a tape means in said housing including a cleaning tape for wiping said transducer head to clean the same, means in said housing guiding said cleaning tape to move past the transducer head, a demagnetizing means in said housing comprising a multipolar, permanent magnet mounted for turning movement to provide a reversing magnetic field, and a movable means for providing a diminishing intensity for said field to demagnetize said head.

3. A unit for insertion into a magnetic tape player or recorder apparatus to clean and demagnetize a transducer head and to clean tape transport elements in said apparatus, said unit comprising: a housing tape means in said housing including a cleaning tape, tape guide means for guiding said cleaning tape past the transducer head and said tape transport elements to wipe and thereby clean the same, a permanent multipolar magnet for demagnetizing said transducer head disposed within said housing, and means in said housing for turning said permanent magnet and for causing said magnet to shift away from said transducer head in response to operation of said tape transport elements and transport of said tape thereby providing a reversing and diminishing intensity field to demagnetize said transducer head.

4. A unit in accordance with claim 3 in which means within said housing supports said magnet for rotation and in which said tape is partially wrapped about said magnet to rotate the magnet with movement of said tape.

5. A unit in accordance with claim 3 in which a window is provided in said housing to view said tape and in which a visual indicating means is provided on said tape to indicate that the demagnetization is completed.

6. A unit in accordance with claim 3 in which support means for said magnet is provided in said housing and includes a biasing means for urging said magnet to shift relative to said transducer head.

7. A unit in accordance with claim 6 in which said biasing means is in the form of spring arm having said magnet mounted thereon for rotation about an axis through said magnet.

8. A unit in accordance with claim 7 in which said spring arm engages and is held by a coil of said tape in a position closely adjacent said transducer head and in which removal of the said tape from said coil causes a reduction in the size of the coil permitting the spring arm to shift said magnet away from said transducer head.

9. A unit in accordance with claim 3 in which said tape is endless and moves in an endless path past said transducer head and in which said means to rotate said magnet and to shift the same includes a cam means engaging said magnet and driven by said tape transport elements.

10. A unit in accordance with claim 9 in which an indicator means is operated by said cam means to indicate when said transducer head has been demagnetized.

11. A unit in accordance with claim 10 in which said indicator means includes an indicating flag portion visible from the exterior of said cartridge and in which said cam means moves said indicator from a position indicating that the demagnetization is under way to a position indicating that the demagnetization has been completed.

12. A cassettelike demagnetizer and cleaner for a transducer head of a magnetic tape playback or recording apparatus comprising, a cassettelike housing having top and bottom walls and sidewalls extending between the top and bottom walls, first and second tape reels journaled for rotation within said housing, a cleaning tape attached to each of said respective reels for winding and unwinding between the respective reels, means on each of said reels for establishing a driving connection with a driving spindle of said magnetic tape playback or recording apparatus, an opening in one of said housing sidewalls to admit the transducer head for engagement with said cleaning tape, additional openings in said housing walls to admit tape transport elements for driving engagement of said cleaning tape to transport the same past said transducer head, a multipolar, permanent magnet mounted for rotation and for movement from a position adjacent said transducer head to a position spaced from said transducer head, a spring arm engageable with a coil of tape on a first one of said reels to shift said spring arm with a change in size of the coil engaged thereby, means on said spring arm mounting said magnet for rotation, and a portion of said tape engaging said permanent magnet for rotating said permanent magnet to establish a reversing field while said magnet is being shifted relatively to said transducer head.

13. A cartridgelike demagnetizer and cleaner for a transducer head of a magnetic tape playback or recording apparatus comprising a cartridgelike housing having a top wall, a bottom wall and sidewalls joined to said top and bottom walls, an endless cleaning tape mounted in said housing for movement by and for engaging cleaning the transducer head, a pressure roller journaled in said housing for engaging said cleaning tape and establishing a driving couple with a capstan of said magnetic playback or recording apparatus to transport said tape, a multipolar permanent magnet rotatably mounted to produce a reversing flux field and shiftable relative to said transducer head to provide a flux field of decreasing intensity to demagnetize said transducer head, means supporting said magnet for rotation and for shifting movement and for urging said magnet to move in one direction relative to said transducer head, and means driven by said pressure roller to shift said magnet against the urging and relative to said transducer head.

* * * * *

UNITED STATES PATENT OFFICE
CERTIFICATE OF CORRECTION

Patent No. 3,647,990 Dated March 7, 1972

Inventor(s) Edward A. Eul, Jr. et al

It is certified that error appears in the above-identified patent and that said Letters Patent are hereby corrected as shown below:

Column 3, line 5, change "1.125" to "0.125".

Signed and sealed this 6th day of February 1973.

(SEAL)
Attest:

EDWARD M.FLETCHER,JR.
Attesting Officer

ROBERT GOTTSCHALK
Commissioner of Patents